(12) United States Patent
Winser et al.

(10) Patent No.: US 7,949,955 B2
(45) Date of Patent: May 24, 2011

(54) VIRTUAL MAGNIFYING GLASS SYSTEM ARCHITECTURE

(75) Inventors: Michael Winser, Westport, CT (US); David V. Esposito, North Haven, CT (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 11/196,510

(22) Filed: Aug. 4, 2005

(65) Prior Publication Data

US 2007/0033542 A1    Feb. 8, 2007

(51) Int. Cl.
G06F 3/00       (2006.01)
G06F 3/14       (2006.01)
G09G 5/00       (2006.01)
G09G 5/02       (2006.01)

(52) U.S. Cl. ......... 715/801; 715/768; 345/629; 345/660
(58) Field of Classification Search .................. 715/801, 715/768; 345/629, 660
See application file for complete search history.

(56) References Cited

U.S. PATENT DOCUMENTS

| | | | |
|---|---|---|---|
| 5,298,890 A | | 3/1994 | Kanamaru et al. |
| 5,375,199 A | * | 12/1994 | Harrow et al. ................. 715/771 |
| 5,598,183 A | | 1/1997 | Robertson et al. |
| 5,651,107 A | * | 7/1997 | Frank et al. .................... 715/768 |
| 5,696,530 A | * | 12/1997 | Maejima ....................... 345/671 |
| 5,754,348 A | | 5/1998 | Soohoo |
| 5,808,601 A | | 9/1998 | Leah et al. |
| 5,808,604 A | | 9/1998 | Robin |
| 5,815,138 A | | 9/1998 | Tsubaki et al. |
| 6,128,006 A | | 10/2000 | Rosenberg et al. |
| 6,184,859 B1 | * | 2/2001 | Kojima .......................... 345/629 |
| 6,572,476 B2 | | 6/2003 | Shoji ............................... 463/33 |
| 6,590,583 B2 | | 7/2003 | Soohoo |
| 6,704,034 B1 | * | 3/2004 | Rodriguez et al. ............ 715/860 |
| 7,009,600 B2 | * | 3/2006 | Jones et al. ................... 345/173 |
| 7,275,219 B2 | | 9/2007 | Shoemaker |
| 2002/0011990 A1 | | 1/2002 | Anwar |
| 2003/0076363 A1 | | 4/2003 | Murphy |
| 2003/0210262 A1 | | 11/2003 | Gahm et al. |
| 2005/0120310 A1 | * | 6/2005 | Sahashi et al. ................ 715/788 |
| 2006/0061597 A1 | * | 3/2006 | Hui ............................... 345/629 |

(Continued)

OTHER PUBLICATIONS

Ezaki et al., "Text Detection from Natural Scene Images: Towards a System for Visually Impaired Persons", 2004, Proceedings of the 17th International Conference on Pattern Recognition, vol. 2, p. 686.*

(Continued)

*Primary Examiner* — William L Bashore
*Assistant Examiner* — Jordany Núñez
(74) *Attorney, Agent, or Firm* — Merchant & Gould

(57) ABSTRACT

A display screen magnifier is controllable by a user to magnify selected portions of a desktop including windows open on the screen. A magnified image is presented within a moveable magnifier frame. The magnified image corresponds to screen content located within a magnification region underlying the magnifier frame, magnified to a set level of magnification. The magnifier is configured to remain on top of the display screen desktop, including open windows, while it is activated. It also passes events of a user input device to windows located beneath the magnifier, and dynamically updates the magnified image to reflect changes in underlying screen content. The display screen magnifier is configured to operate this way through a leveraging of resources made available by application programming interfaces (APIs) of an operating system, namely a windows style, and a second stage screen content compositing engine associated with the windows style.

14 Claims, 5 Drawing Sheets

U.S. PATENT DOCUMENTS

2007/0030245 A1 2/2007 Ngari et al.
2007/0033543 A1 2/2007 Ngari et al.
2007/0033544 A1 2/2007 Fleisher et al.

OTHER PUBLICATIONS

International Search Report for Application No. PCT/US06/30151 dated Nov. 8, 2007, 8 pages.
U.S. Office Action mailed May 12, 2008 in U.S. Appl. No. 11/196,511.
U.S. Office Action mailed Jan. 23, 2008 in U.S. Appl. No. 11/196,515.
U.S. Final Office Action mailed Sep. 29, 2008 in U.S. Appl. No. 11/196,515.
U.S. Office Action mailed Apr. 3, 2008 in U.S. Appl. No. 11/356,142.
U.S. Office Action mailed Nov. 25, 2008 in U.S. Appl. No. 11/356,142.
U.S. Official Action mailed Aug. 12, 2009, in U.S. Appl. No. 11/196,511.
Executable software/documentation: ABF Magnifying Tools.
Executable software/documentation: Bigshot.
Executable software/documentation: Dragnifier.
Executable software/documentation: ExactMouse2.0.
Executable software/documentation: LunarPlusDemo.
Executable software/documentation: Magnifixer.
Executable software/documentation: ZoomMagic.
Executable software/documentation: ZoomText.
MSDN website article: "About Hooks," 2005.
MSDN website article: "About Mouse Input," 2005.
MSDN website article: "CreateWindowEx Function," 2005.
MSDN website article: "Driver Chain Manager," 2005.
MSDN website article: "Window Features," 2005.
MSDN website article: "Win32 Hooks," 1994.
Specification (including claims) and drawings of U.S. Appl. No. 11/196,515, filed Aug. 4, 2005; inventors: Joseph K. Ngari et al.
Claims of divisional of U.S. Appl. No. 11/196,515, filed Feb. 17, 2006; inventors: Joseph K. Ngari et al.
U.S. Official Action mailed Jun. 9, 2009, in U.S. Appl. No. 11/196,515.
U.S. Official Action mailed Dec. 7, 2009, in U.S. Appl. No. 11/196,515.
U.S. Official Action mailed Feb. 12, 2010, in U.S. Appl. No. 11/356,142.
Office Action mailed Dec. 31, 2008, in U.S. Appl. No. 11/196,511.
Office Action mailed Jul. 7, 2009, in U.S. Appl. No. 11/356,142.

* cited by examiner

VIRTUAL MAGNIFYING GLASS SYSTEM ARCHITECTURE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Various types of computer display screen magnification and zoom functionalities are known. In general, such magnifiers show a magnified copy of a portion of what appears on a computer's screen. Such functionalities have been provided as accessibility options for the visually impaired, and for other purposes, both as features provided within particular application software, and as specialty software intended to provide magnification/zoom functionalities generally available for use at an operating system (e.g., desktop) level and with user applications. For the visually impaired, such features may assist with the reading of small screen text and/or the discernment of icons and the like. More generally, magnifications and zoom functionalities can be useful within applications, and at an operating system (e.g., desktop) level, where it may be desired to enlarge all or a portion of screen objects or images.

An example of a user application providing zoom functionalities is Adobe Acrobat's .pdf document reader. In addition to standard toolbar zoom level selections via a dropdown menu, there are three pan and zoom related features: Loupe Tool, Pan & Zoom window, Dynamic Zoom tool.

With the Loupe Tool, a user controls the zoom level with a slider and controls the zoom position by clicking within a document. The zoomed area is represented by a rectangle on the document which is inversely proportional in size to the zoom level; the zoomed view is shown in a separate window. With the Pan & Zoom window feature, a resizable box is moveable on a document page presented in a small window. A document view provided in the background zooms and pans as the box is resized and moved. With the Dynamic Zoom tool, the regular cursor changes to a representation of a small magnifying glass signifying that a zoom mode has been entered. In this mode, a user is able to click on the document and drag up/down to dynamically zoom in and out, and is able to pan at the lateral edges of the document.

As a further example of a zoom feature provided as part of user application software, Digital Image Pro offers a set of controls on a tool bar provided as part of a window for navigating images. These include a slider based zoom level, return to 100% button, panning window, and a zoom to selection button. Similar to the Adobe Pan and Zoom feature, a box whose size is inversely proportional to a selected zoom level is moveable on an image presented in a small window. A magnified view of the image portion within the box is provided in the background.

Applications commonly implement zoom functionalities utilizing the input facilities of a computer mouse. For example, rolling the scroll wheel on a mouse in conjunction with pressing the CTRL key on the keyboard (CTRL+Wheel) may allow users to zoom in and out of applications. Each application has its own zooming increments, and scroll wheel zooming applies these increments. Other zoom options reside within the Microsoft IntelliPoint™ (mouse) software control panel, as shown in Related Art FIG. 4. On the Buttons tab, Zoom In and Zoom Out commands have recently been added as options for each mouse button. Some Microsoft keyboards have a Zoom control (e.g., "slider"), which operates under the control of Microsoft's IntelliType™ software.

As compared with magnifier software developed for use at an operating system (desktop) level, there is greater flexibility in the development of magnification and zoom features for a particular user application, as the application can be structured from "the ground up" to accommodate those features. Also, with an application specific magnifier, interaction of the magnifier with independently executing programs and their associated windows is generally not a concern. Zooming is easily achieved in an application. The application has an internal representation of the content to be displayed and if designed correctly it can display the content at different sizes or zoom levels. In Microsoft's Word,® for example, you can zoom in until only a few lines show on the screen yet the text is very clear because the fonts are based on vector graphics (mathematical descriptions of the characters instead of bitmaps).

With a magnifier designed to be generally available for use with the desktop and with any other open windows, i.e., at an operating system (OS) level, the internal representation that an application may have for zoom functionalities is not available. Rather, magnification is performed by manipulation of a screenshot or bitmap of the output. Although this doesn't typically increase the detail beyond the applicable screen resolution, it does allow users to view user interface (UI) objects and text at larger sizes. The manner in which such a magnifier interacts with the various underlying screen elements and windows is of great importance; the nature of that interaction is likely to have a significant impact on the actual and perceived usability of the feature.

An example of an existing OS level screen magnification feature is the "Magnifier" of Microsoft's Windows XP® operating system. Magnifier is a display utility that makes the screen more readable for users who have impaired vision. It creates a separate window that displays a magnified portion of the screen, which portion is determined by the position of the pointing device cursor, e.g., mouse pointer. A user can change the magnification level via settings in the feature's control panel. The user can move or resize the Magnifier window, or drag it to the edge of the screen and lock it into place.

A known screen magnification specialty application is Zoom Magic. When launched, this application opens a custom magnification window, as shown in FIG. 1. The window is sizable and moveable as a regular window. All tools/settings are available in the title bar. The window magnifies whatever is immediately beneath. The mouse cursor can move over the magnified content but it cannot interact with the content.

Referring to FIG. 1, there is a cursor tracking mode initiated by clicking the arrow button in the window title bar. Clicking on the different red arrows will dock the window top/bottom/left/right. Center undocks the window and reverts it to a regular window. This mode allows overlay of other open windows but does not allow interaction with underlying application windows within the magnification window. Cursor tracking can be toggled on/off by clicking the arrow button. There is an option to keep the magnification window on top of the desktop and any other open windows, but in this mode the magnified image does not update unless the magnification window is clicked.

"Lens" is a tool offered by ABF Magnifying Tools (http://www.abf-soft.com/magnifying-tools.shtml) which creates a caricature of a magnifying glass, as seen in Related Art FIG. 2. The user can reposition the glass by dragging and use it to selectively zoom-in on areas of the screen. A user can adjust the magnification level by clicking the + & − buttons. This tool takes a static screen shot at the time of activation. If anything changes on the screen, it is not reflected in the zoomed image.

Another example of a known accessibility specialty application is ZoomText 8.1, by AI² (http://www.aisquared.com/index.htm). When application is launched, a modal control panel type user interface (UI) appears, as shown in Related Art FIG. 3.

The magnifier/zoom features of ZoomText 8.1 have several modes:

A Full Screen Mode magnifies the entire screen incrementally. As the mouse nears the edges of the screen, panning is initiated automatically.

An Overlay Mode creates a resizable square window in the bottom right hand corner of the screen. The mouse tracks in the regular (1:1) view and that movement is mirrored in the magnified view. As the mouse nears the edges of the screen, panning is initiated automatically within the zoom window.

A Lens Mode creates a floating resizable square window that moves with the mouse cursor. A Line Mode creates a horizontal band across the screen that moves up and down with changes in the Y coordinates of the mouse cursor. Dynamic updating occurs within the magnification window to reflect changes in the screen content during use, and interaction with underlying application windows is available through the magnification window, i.e., mouse and keyboard input are permitted to pass through the magnifier to the underlying window.

A Docked Mode creates a resizable band (outlined in black) positioned against either the top, bottom right or left edges of the screen. Mouse movement is tracked only in the zoomed view, while the 1:1 view is locked.

When enabled, a Freeze It tool allows the user to draw a resizable box on the screen and lock down ("freeze") its position. The predefined box view locks the zoom position to particular X and Y coordinates. If content changes within the area that is magnified, then it is reflected in the magnified content within the box. Freeze mode is available only in the "Full Screen" magnifier mode. In the full Screen mode, there is no lens; the whole screen is magnified and the mouse pans to "off-screen" areas.

Known display screen magnifiers are less than ideal in terms of their simplicity and convenience, and the intuitiveness of their use. Also, the manner in which some magnifiers are implemented renders them highly fragile, i.e., susceptible to malfunction in the event of operating system/driver updates and patches.

It would be desirable to have a robust computer implemented display screen magnifier which behaves more like an actual optical lens magnifier in terms of being able to "float above" the computer desktop and other open windows, to provide a magnified view of what is beneath it in a natural and intuitive way, and to permit uninhibited viewing and interaction with the underlying desktop/windows.

Implementing a magnification application intended for use with an operating system that provides a windows-based graphical user interface (GUI), e.g., a Microsoft's Windows® operating system, presents certain challenges. If the magnifier is created as a conventional window, the magnification window itself becomes a part of the desktop when it is opened. As a result, system calls to get desktop images for magnification will include the magnifier window itself (and not that portion of the GUI underneath it). Use of such system calls to do magnification, as in the Windows XP magnifier, lead to an infinity mirror effect. The result from a user perspective is that he/she is precluded from obtaining a magnified view of what lies beneath the magnification window.

A number of available magnification applications, such as the previously mentioned ZoomText product, have dealt with the above-described difficulty using a technique known as driver chaining. With this approach, a selected portion of the screen content composited by the operating system is intercepted and manipulated by the kernel level magnifier before going to the video display driver. With screen reading or screen magnification software, assistive technology vendors (ATVs) essentially locate the display driver, get the information needed for it, then pass the sometimes modified Display Driver Interface (DDI) calls to the original display driver. (Certain remote control software also uses this technique to intercept information being passed to a remote computer.) The DDI interception technique is called driver chaining. The chained driver intercepts the DDI calls from GDI to the display driver and manipulates the calls in such a way as to magnify a part of the screen. As far as the Windows® operating system is concerned, the superimposed magnifier output is simply not there, so calls to copy portions of the desktop will not see it.

Because driver chaining intervenes with a preestablished operating system/driver relationship, it may not be officially supported by the operating system supplier, e.g., Microsoft. As a result, the technique tends to be very fragile and prone to malfunction, e.g., if the operating system is upgraded with new service packs or drivers. Additional information concerning driver chaining, and its application in screen magnifiers and other assistive technology products, can be found on the Microsoft Developers Network (MSDN), at http://msdn.microsoft.com/library/default.asp?url=/library/en-us/dnacc/html/atg_driverchain.asp.

SUMMARY OF THE INVENTION

The present invention provides software/firmware based systems and methods, executable on a data processing device (e.g., a general or special purpose computer) provided with display screen and user input device (e.g., a pointing device such as a computer mouse, trackball or touch pad, or a computer keyboard). These systems and methods serve to provide a means by which a user may conveniently, selectively enlarge portions of the content of the screen display. New approaches to providing such a display screen magnifier are provided in order to address one or more shortcomings of known magnifiers as described above.

A magnifier in accordance with the invention is controllable by a user to magnify selected portions of a desktop and windows open on the screen. A moveable magnifier frame is provided, within which a magnified image is presented. The magnified image corresponds to screen content located within a magnification region underlying the magnifier frame, magnified to a set level of magnification.

A display screen magnifier according to the invention is configured to remain on top of the display screen desktop, including open windows, while it is activated. During periods of activation, it also passes events of a user input device to windows located beneath the magnifier, and dynamically updates the magnified image to reflect changes in underlying screen content. In accordance with an aspect of the invention, the display screen magnifier is configured to operate by leveraging resources made available by application programming interfaces (APIs) of an operating system, namely a windows style, and a second stage screen content compositing engine associated with the windows style.

In accordance with an aspect of the invention, a magnifier window is created which is effectively invisible to the calls to get a desktop image to be magnified. This enables the magnifier to operate in an intuitive manner, permitting the viewer to view what is directly beneath the magnifier, and to interact with the magnifier, without taking focus away from open application windows and/or the desktop. An embodiment of the invention makes advantageous use of windows styles made available by the APIs of Microsoft Windows® 2000 and XP operating systems. In this manner, the need for use of fragile driver chaining techniques is avoided.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

Figure 1:
FIG. 1 is a screen shot showing an on-screen magnification window of a Related Art magnifier product.
Figure 2:
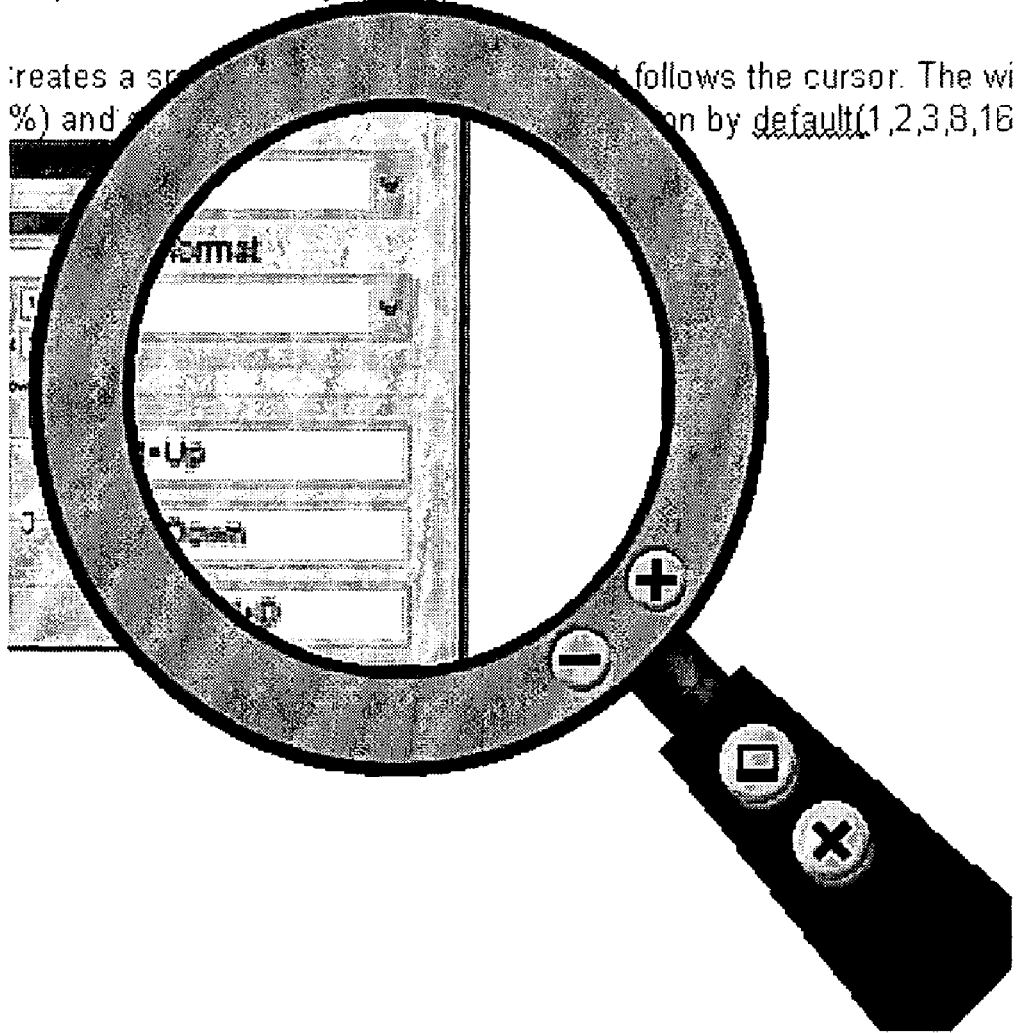
FIG. 2 is a screenshot showing another Related Art magnifier product.
Figure 3:
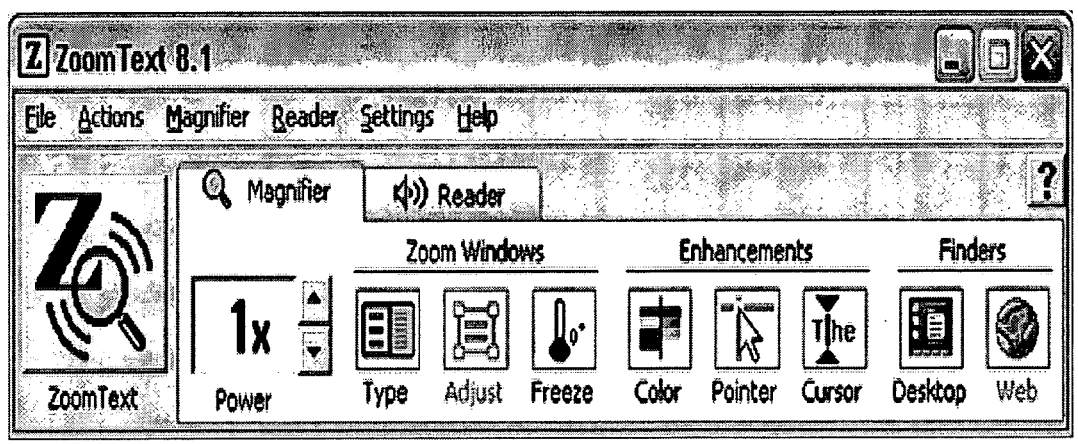
FIG. 3 is a screen shot showing an on-screen tool bar window of a Related Art magnifier product.
Figure 4:
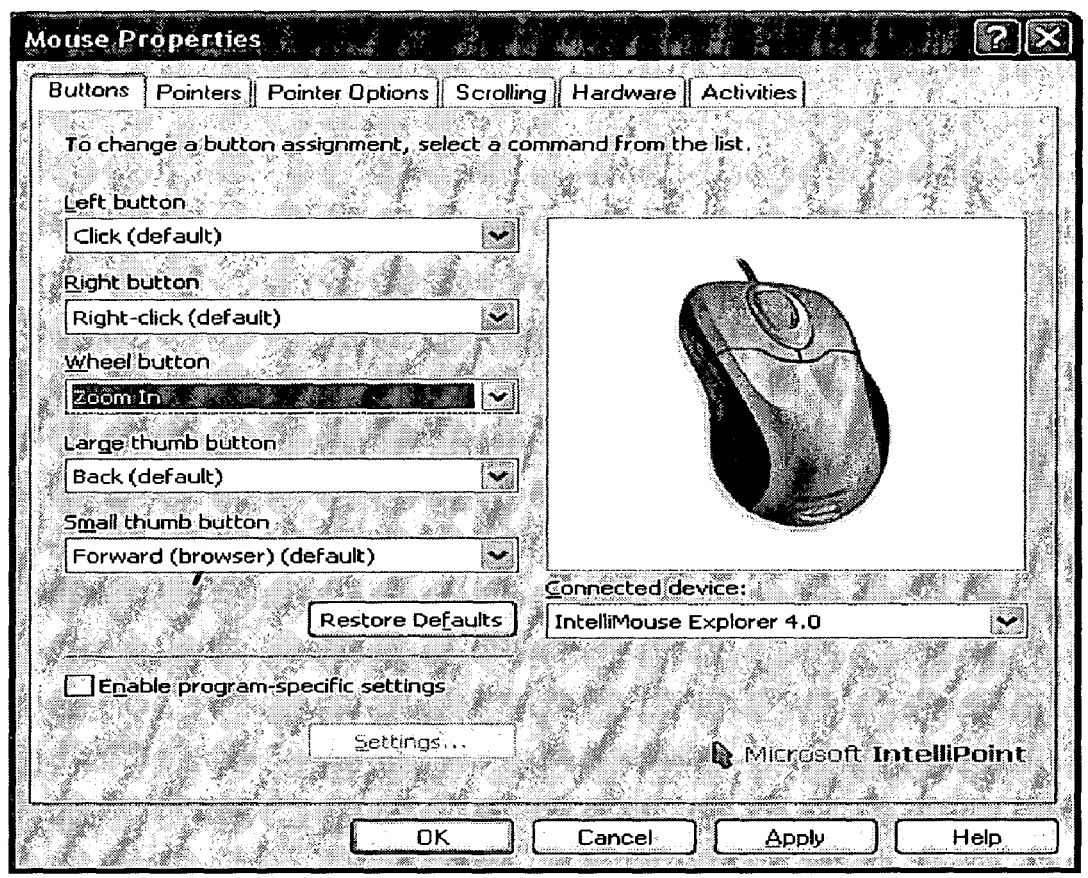
FIG. 4 shows a control panel provided as part of software for use with a Related Art computer mouse product of the present assignee.

An on-screen magnifier according to the invention includes a moveable magnifier frame within which a magnified image is presented. The magnified image corresponds to screen content located within a magnification region underlying the magnifier frame, magnified to a set level of magnification.

A display screen magnifier in accordance with an embodiment of the invention is configured such that while it is activated, it remains on top of the desktop and any other open windows of a screen display. It passes events of a user input device (e.g., a mouse or keyboard) to windows located beneath the magnifier, and dynamically updates the magnified image to reflect changes in underlying screen content. Such a display screen magnifier may be embodied in software or firmware executed on a general purpose computer or other data processing device provided with a display screen and user input device. For example, such a display screen magnifier may be embodied as instructions stored on a machine readable storage medium, the instructions executable by a data processing device.

An aspect of the invention involves achieving the above-described behavior by leveraging resources made available through existing application programming interfaces (APIs) of an operating system, particularly a windows style, and a second stage screen content compositing engine associated with that windows style. As used herein, "windows style" broadly encompasses any set of parameters specifying the functional and/or visual characteristics of a window which is to appear as part of a graphical user interface (GUI), including sets of parameters included within one or plural designated windows styles specified within a set of APIs. The inventive approach can be used in lieu of fragile driver chaining techniques.

In an exemplary embodiment of the invention, the magnifier comprises a magnify window created with the following extended window styles, which are provided as part of the APIs of Microsoft's Windows® 2000 and XP operating systems for personal computers:

WS_EX_TRANSPARENT: This windows style specifies that the window will not be painted until windows beneath this window are painted. This allows a "snapshot" of the screen below the magnifier to be taken before the magnifier is drawn.

WS_EX_LAYERED: When this style is used in combination with the WS_EX_TRANSPARENT style, the magnifier window will not receive user input from the mouse or keyboard; all input is passed to the applications below the magnifier. When the magnifier window is created as a layered transparent window, pointing device (e.g., mouse) events will be passed to other windows underneath the layered window. Also, this windows style optimizes per-pixel alpha blending which can be used to give the magnifier an alpha blended frame. This characteristic can be used to give the user a visual clue that the magnifier is "floating" above the desktop.

WS_EX_NOACTIVATE: This windows style also makes the window so that it doesn't take "focus." That is, if the magnifier window is provided as a window that ordinarily becomes visually highlighted (e.g., a regular window provided with a title bar), the window will not become visually highlighted (e.g., lit-up) as an active window upon clicking within it with a pointing device (e.g., mouse). The user can click through the magnifier. Also, keyboard events (input) will not be captured by the magnifier. This permits the user to interact freely with an application window positioned below the magnifier. Also, with this style, the magnifier does not appear on the taskbar.

WS_EX_TOOLWINDOW: Addition of the style makes it so the magnifier also does not show up in the alt-tab listing of open windows/applications.

WS_EX_TOPMOST: This Windows style maintains the magnifier as the topmost window. Without it, the utility of the magnifier could be diminished by the magnifier disappearing behind other windows.

Additional information on these and other extended windows styles included in the APIs of Microsoft's Windows® operating systems can be found on the Microsoft Developers Network (MSDN), e.g., at http://msdn.microsoft.com/library/default.asp?url=/library/enus/winui/winui/windowsuserinterface/windowing/windows/windowreference/windowfunctions/createwindowex.asp.

An exemplary magnifier window creation function that may be used is set forth below:

```
// Create Magnifier window
HWND hwnd=::CreateWindowEx(
    WS_EX_NOACTIVATE | WS_EX_TRANSPARENT |
    WS_EX_LAYERED | WS_EX_TOPMOST |
    WS_EX_TOOLWINDOW,
        wndClass.lpszClassName, L"",
        WS_POPUP | WS_VISIBLE | WS_DISABLED,
        0,0,0,0,
        NULL, NULL, hInstance, 0);
```

Figure 5:
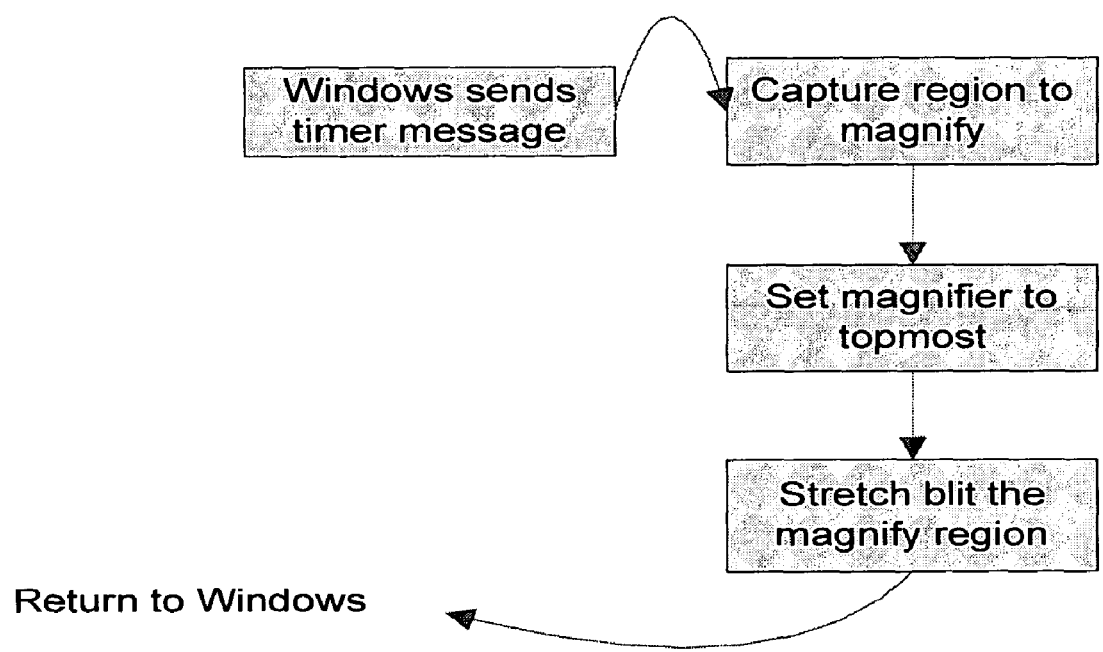
FIG. 5 is a flow-diagram illustrating a sequence of operational process steps performed by a screen magnifier embodiment of the invention.

An operational process of a magnifier in accordance with an aspect of the invention is illustrated in FIG. 5. Once the magnifier window is activated, is set so that the magnifier receives a timer message at a predetermined rate (e.g., about 15 to 24 times a second). In one embodiment, the timer interval is set at 15 milliseconds, or 67 times per second. The magnifier uses the timer message to continuously update the magnifier image to reflect changes in underlying screen content occurring while the magnifier is in use (activated). An update frequency in the indicated range should permit the magnified image to change relatively smoothly as the magnification frame is moved on the screen, or if there is an animation playing in a window below it, thereby emulating the appearance of an actual optical magnifying glass held and moved in front of the screen. As shown in FIG. 5, when a timer message is received, the region to be magnified is captured, the magnifier window is set to topmost and then the capture region is drawn (e.g., "stretch blit") into the magnifier at the proper magnification level.

An embodiment of the invention makes advantageous use of the fact that USER32 (the Win32 window manager) implements a relatively simple composition engine for carrying out a second stage of composition of screen content when Transparent windows are created. This is a "second stage" of composition in the sense that it is different from, and in addition to, the ordinary or normal desktop composition process. The normal composition process employed by Microsoft's Windows® operating systems follows what is sometimes referred to as a modified painters algorithm. Windows are painted to the desktop in reverse z order (top to bottom). Aggressive "clipping" is used to confine the areas of the screen to be redrawn to areas where content is being added or change has occurred, to thereby avoid screen flicker and reduce the amount of actual painting/drawing work.

When a window uses drop shadows, transparency or any other effect that requires Windows® to merge the window's pixels with whatever is "behind" it, Windows® creates intermediate bitmap buffers for the desktop and the transparent windows, respectively. The contents of these buffers are then "composed" to create the final output. Calls to take a snapshot of the desktop (e.g., GetDC(NULL)), and to stretch blit (StretchBlt) from the desktop, will use the desktop buffer, not the desktop resulting from the second stage composition process. By making itself a Windows® "Transparent" window (even if its opacity is set to 100%), the magnification window both enables the second stage composition process, and puts itself above the main desktop. Use of the "Topmost" windows style will keep the magnifier topmost, by preventing a new window from subsequently appearing and setting itself as topmost.

The present invention has been described in terms of preferred and exemplary embodiments thereof. Numerous other embodiments, modifications and variations within the scope and spirit of the appended claims will occur to persons of ordinary skill in the art from a review of this disclosure. In the claims, any use of the labels for algorithm variables appearing in the specification is for convenience and clarity and is not intended to have any limiting effect.

The invention claimed is:

1. A computer-implemented method for virtual magnification, the method comprising:
   receiving a selection to activate a movable magnify window, wherein the movable magnify window is an operating system magnify window configured to magnify a plurality of different applications installed on the operating system, wherein the movable magnify window magnifies at least a portion of an active desktop window positioned below the magnifying window, wherein the magnifying window is configured to leverage a plurality of preexisting application user interface window styles of the operating system, wherein the preexisting window styles of the operating system include:
   a tool window style, wherein the tool window style is configured to prevent a visual indicator designating the magnify window as activated being displayed to a user in a user selectable listing of open applications of the plurality of different applications installed on the operating system;
   a transparent window style, wherein the transparent window style is configured to cause the display of the magnify window to be updated after the active window display is updated,
   a layered window style, wherein the layered window style is configured to cause inputs received in the magnify window to be automatically passed to the portion of the active desktop window below the magnifying window,
   a non-active window style, wherein the non-active window style is configured to maintain the active desktop window as active when the magnify window receives inputs, and
   a topmost window style, wherein the topmost window style is configured to maintain the magnify window as a topmost window in relation to the active desktop window;
   receiving a timer message at a predefined periodic interval at the magnify window, wherein receipt of the timer message at the magnify window causes a processor to capture the portion of the active desktop window positioned below the magnify window, generate a bit-map of the portion of the active desktop window positioned below the magnify window, stretch the generated bit-map in accordance with a magnify level of the magnify window, and update the magnify window with the generated stretched bit-map of the portion of the active desktop window positioned below the magnify window; and
   upon receiving an input, in the magnify window, to the generated stretched bit-map, maintaining the active desktop window as the active window in accordance with the non-active window style of the magnify window, maintaining the magnify window as the topmost window in accordance with the topmost window style of the magnify window, and passing the received input from the generated stretched bit-map of the magnify window to the active desktop window in accordance with the layered window style.

2. The computer-implemented method of claim 1, wherein the magnify window is not associated with driver chaining.

3. The computer-implemented method of claim 1, wherein the non-active window style, is further configured to maintain a visually highlighted status of the active desktop window when the magnify window receives an input.

4. The computer-implemented method of claim 1, wherein the active desktop window includes an executing video stream, wherein the magnify window includes a magnified execution of the video stream by receiving the timer message.

5. A machine readable storage medium containing instructions thereon for execution by a data processing device, the instructions for virtual magnification and comprising:
   receiving a selection to activate a movable magnify window, wherein the movable magnify window is an operating system magnify window configured to magnify a plurality of different applications installed on the operating system, wherein the movable magnify window magnifies at least a portion of an active desktop window positioned below the magnifying window, wherein the magnifying window is configured to leverage a plurality of preexisting application user interface window styles of the operating system, wherein the preexisting window styles of the operating system include:
- a tool window style, wherein the tool window style is configured to prevent a visual indicator designating the magnify window as activated being displayed to a user in a user selectable listing of open applications of the plurality of different applications installed on the operating system;
- a transparent window style, wherein the transparent window style is configured to cause the display of the magnify window to be updated after the active window display is updated,
- a layered window style, wherein the layered window style is configured to cause inputs received in the magnify window to be automatically passed to the portion of the active desktop window below the magnifying window, and
- a non-active window style, wherein the non-active window style is configured to maintain the active desktop window as active when the magnify window receives inputs;

receiving a timer message in association with the magnify window, wherein receipt of the timer message at the magnify window causes a processor to capture the portion of the active desktop window positioned below the magnify window, generate a bit-map of the portion of the active desktop window positioned below the magnify window, stretch the generated bit-map in accordance with a magnify level of the magnify window, and update the magnify window with the generated stretched bit-map of the portion of the active desktop window positioned below the magnify window; and upon receiving an input, in the magnify window, to the generated stretched bit-map, maintaining the active desktop window as the active window in accordance with the non-active window style of the magnify window, and passing the received input from the generated stretched bit-map of the magnify window to the active desktop window in accordance with the layered window style.

6. The machine readable storage medium of claim 5, wherein the magnify window is not associated with driver chaining.

7. The machine readable storage medium of claim 5, wherein the non-active window style is further configured to maintain a visually highlighted status of the active desktop window when the magnify window receives an input.

8. The machine readable storage medium of claim 5, wherein the magnify window receives timer messages at predetermined intervals.

9. The machine readable storage medium of claim 5, wherein the active desktop window includes an executing video stream, wherein the magnify window includes a magnified execution of the video stream by receiving the timer message.

10. A system for virtual magnification, the system comprising:
- a data processing device; and
- a machine readable storage medium having executable instructions stored thereon, wherein the executable instructions are configured for:
- activating a movable magnify window, wherein the movable magnify window is an operating system magnify window configured to magnify a plurality of different applications installed on the operating system, wherein the movable magnify window magnifies at least a portion of a desktop window below the magnifying window, wherein the magnifying window is configured to leverage a plurality of preexisting application user interface window styles of the operating system, wherein the preexisting window styles of the operating system include:
  - a tool window style, wherein the tool window style is configured to prevent a visual indicator designating the magnify window as activated being displayed to a user in a user selectable listing of open applications of the plurality of different applications installed on the operating system;
  - a transparent window style, wherein the transparent window style is configured to cause the magnify window to be displayed after the desktop window,
  - a layered window style, wherein the layered window style is configured to cause inputs received in the magnify window to be automatically passed to the portion of the desktop window below the magnifying window, and
  - a non-active window style, wherein the non-active window style is configured to prevent the magnify window from becoming actively focused,
- receiving a timer message in association with the magnify window, wherein receipt of the timer message at the magnify window causes a processor to capture the portion of the active desktop window positioned below the magnify window, generate a bit-map of the portion of the active desktop window positioned below the magnify window, stretch the generated bit-map in accordance with a magnify level of the magnify window, and update the magnify window with the generated stretched bit-map of the portion of the active desktop window positioned below the magnify window; and
- upon receiving an input, in the magnify window, to the generated stretched bit-map, maintaining the active desktop window as the active window in accordance with the non-active window style of the magnify window, and passing the received input from the generated stretched bit-map of the magnify window to the active desktop window in accordance with the layered window style.

11. The system of claim 10, wherein the magnify window is not associated with driver chaining.

12. The system of claim 10, wherein the non-active window style, is further configured to prevent a visually highlighted status of the magnify window when the magnify window receives an input.

13. The system of claim 10, wherein the magnify window receives timer messages at predetermined intervals.

14. The system of claim 10, wherein the active window includes an executing video stream, wherein the magnify window includes a magnified execution of the video stream by receiving the timer message.

* * * * *